United States Patent [19]

Asano et al.

[11] 3,931,050

[45] Jan. 6, 1976

[54] CATALYST FOR PURIFYING EXHAUST GAS FROM VEHICLES

[75] Inventors: Mitsuru Asano, Okazaki; Minoru Ohta, Anjo; Masami Oki, Nagoya, all of Japan

[73] Assignees: Nippon Soken, Inc.; Nippondenso Co., Ltd., both of Japan

[22] Filed: Apr. 12, 1974

[21] Appl. No.: 460,580

[30] Foreign Application Priority Data
Apr. 13, 1973 Japan.............................. 48-42369

[52] U.S. Cl............ 252/462; 252/465; 252/466 PT; 252/466 B; 252/472; 252/473; 252/474; 423/213.5; 252/477 R
[51] Int. Cl.² ............... B01J 21/04; B01J 23/40; B01J 23/64
[58] Field of Search.... 252/462, 466 A, 465, 466 B, 252/472, 473, 474, 477 R; 423/213.2, 213.5

[56] References Cited
UNITED STATES PATENTS

| | | | |
|---|---|---|---|
| 3,397,154 | 8/1968 | Talsma.............................. | 252/463 |
| 3,615,166 | 10/1971 | Hindin et al................... | 252/466 PT |
| 3,741,725 | 6/1973 | Graham........................... | 423/213.5 |
| 3,839,224 | 10/1974 | Yonehara et al.............. | 252/477 R |

Primary Examiner—W. J. Shine
Attorney, Agent, or Firm—Cushman, Darby & Cushman

[57] ABSTRACT

A catalyst for purifying exhaust gas from vehicles comprises a monolithic carrier having a plurality of exhaust gas passages penetrating through the carrier, a layer of active refractory metallic oxide such as γ-alumina, containing 1 to 20% by weight of a catalytic metal such as platinum deposited as first layer on inside surfaces of said plurality of the passages, and a layer of exhaust gas-permeable refractory metallic oxide such as γ-alumina free from a catalytic metal deposited as an outermost layer further upon the first layer.

10 Claims, 5 Drawing Figures

A: COMP. EX. 4
B: EXAMPLE 11
C: EXAMPLE 12
D: EXAMPLE 13
E: EXAMPLE 14

○: INITIAL PERCENT PURIFICATION
●: STEADY PERCENT PURIFICATION

CATALYST FOR PURIFYING EXHAUST GAS FROM VEHICLES

This invention relates to a catalyst for purifying exhaust gas from vehicles, and more particularly to a catalyst for converting harmful carbon monoxide (CO), hydrocarbons (HC) and nitrogen oxides ($NO_x$) contained in the exhaust gas from automobiles, etc. to harmless carbon dioxide ($CO_2$), hydrogen ($H_2$), nitrogen ($N_2$), etc.

Heretofore, catalysts for purifying the exhaust gas have been prepared by depositing a layer of active refractory metallic oxide containing such catalytic metals as platinum, palladium, ruthenium, rhodium, etc. onto surfaces of exhaust gas passages penetrating through a monolithic carrier, or directly depositing said catalytic metals simply onto the surfaces of the exhaust gas passages penetrating through said monolithic carrier.

However, the conventional catalysts as prepared in the foregoing manner can perform a satisfactory catalytic action only under relatively mild conditions, but have such inconveniences, when used for a prolonged period of time under very severe conditions as in the service for automobiles, etc., that the reaction of the catalytic metals with the harmful components of the exhaust gas is gradually deteriorated and the catalyst cannot maintain a sufficient catalytic activity. Furthermore, there is such an inconvenience that the catalytic metals are poisoned by lead, sulfur, phosphorus, etc. contained in the exhaust gas, and consequently the catalytic activity is considerably deteriorated.

An object of the present invention is to overcome these inconveniences encountered in the conventional art. According to the present invention, a catalyst is prepared by depositing a layer of active refractory metallic oxide, for example, active alumina, containing a small amount of a catalytic metal, for example, platinum, as first layer on surfaces of a large number of exhaust gas passages penetrating through a monolithic carrier, and further depositing an exhaust gas-permeable layer of refractory metallic oxide, for example, $\gamma$-$Al_2O_3$, containing no catalytic metal as an outermost layer on the first active layer containing the catalytic metal, and a catalyst having a good durability and a good resistance to poisoning can be obtained thereby in the present invention.

In the present invention, deposition of an active refractory metallic oxide layer containing a small amount of catalytic metal on the surfaces of exhaust gas passages penetrating through a monolithic carrier and successive deposition of an exhaust gas-permeable layer of the refractory metallic oxide containing no catalytic metal on the active layer containing catalytic metal can be carried out in several manners.

One of the manners is given as follows: a monolithic carrier is dipped in a solution containing a refractory metal salt, and then the dipped carrier is calcined to decompose the refractory metal salt into active refractory metallic oxide. Then, the monolithic carrier having the active refractory metallic oxide layer thus deposited on the surface is dipped in a solution containing a catalytic metal salt, and the dipped carrier is calcined in air or treated in a hydrogen gas stream, whereby the catalytic metal can be deposited on said active refractory metallic oxide layer with a good distribution. Finally, the carrier having the active refractory metallic oxide layer containing said catalytic metal is dipped in a solution containing only a refractory metal salt, and the dipped carrier is calcined to decompose the salt into an oxide form. The refractory metallic oxide layer can be further formed on said active refractory metallic oxide layer containing the catalytic metal thereby.

The term "active" used herein means a property of promoting a catalytic reaction by increasing a contact area of the catalytic metal with the exhaust gas, and materials having such property, that is, the active materials, are in a very fine granular state.

The term "the exhaust gas-permeable" used herein means that the exhaust gas can be well brought in contact with the catalytic metal in an active refractory metallic oxide layer containing the catalytic metal, which is deposited on the inner surfaces of exhaust gas passages penetrating throughout the monolithic carrier.

The active refractory metallic oxides and exhaust gas-permeable refractory metallic oxides used in the present invention include $\gamma$-$Al_2O_3$ (gamma-alumina), MgO (magnesium oxide), $ThO_2$ (thorium oxide), BeO (beryllium oxide), $La_2O_3$ (lanthanum oxide), BaO (barium oxide) and $Li_2O$ (lithium oxide). Particularly, $\gamma$-$Al_2O_3$ is preferable in the present invention, so long as the catalyst is used for purification of exhaust gas from vehicles.

As the catalytic metal for the purification of the exhaust gas from vehicles, at least platinum, must be used, as shown in Examples which follow, but metals of platinum group elements, such as palladium, ruthenium, rhodium, etc., or a mixture of at least two of these metals or their compounds; metals of transition elements such as nickel, iron, cobalt, copper, chromium, etc. or mixture of at least two of these transition element metals; or mixtures of at least one of the metals of platinum element group with at least one of the metals of transition elements; mixtures of at least one of oxide of metals of transition elements with at least one of metals of platinum group elements; mixtures of at least one of metals of transition elements with at least one of oxides of the metals of transition elements and at least one of metals of platinum group elements can be used together with platinum or not.

In the present invention, a ratio of the catalyst metal to the layer of active refractory metallic oxide is very important from the viewpoint of activity and durability of the catalyst for purifying exhaust gas from the vehicles. That is to say, it is preferable that about 0.1 to about 50% by weight of the catalytic metal is contained in a layer of active refractory metallic oxide containing the catalytic metal, which is to be initially deposited on the monolithic carrier, on the basis of the weight of said layer. Further, it has been found in the experiments that about 1 to about 20% by weight of the catalytic metal is particularly preferable in both activity and durability of the catalyst.

The weight of the outermost, exhaust gas-permeable refractory metallic oxide layer containing no catalytic metal, which is to be deposited further on the layer of active refractory metal oxide containing the catalytic metal on the monolithic carrier, naturally depends upon the ratio of the catalytic metal contained in the layer of active refractory metallic oxide already deposited on the carrier, and kinds of the catalytic metal used and the active refractory metallic oxide as a layer. When platinum is used as a catalytic metal, and $\gamma$-$Al_2O_3$ as an active refractory metallic oxide and an exhaust gas-permeable refractory metallic oxide, it has been found in experiments that the weight of $\gamma$-$Al_2O_3$ as the outermost layer is usually about 1 to about 50 g, preferably 4 to 30 g per gram of platinum. If the weight of the outermost $\gamma$-$Al_2O_3$ exceeds 50 g, the surfaces of the catalytic metal is excessively covered by $\gamma$-$Al_2O_3$, and a satisfactory initial activity is hardly obtained in the most cases.

Now, the present invention will be explained by way of examples, referring to the accompanying drawings, but the examples given below are never limitative of the present invention.

Figure 3:
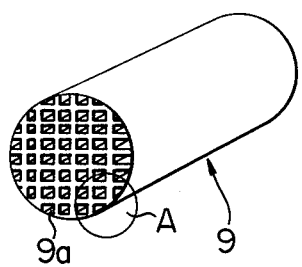
FIG. 3 is a schematic perspective view of a monolithic carrier used in the present invention.
Figure 4:
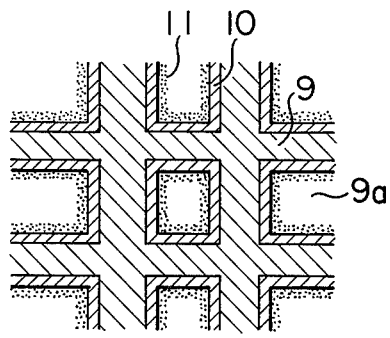
FIG. 4 is a cross-sectional, enlarged view of the part A of FIG. 3.

In FIGS. 3 and 4, numeral 9 is a cylindrical monolithic carrier having a circular cross-section, and the carrier consists mainly of cordierite, one of the refractory materials and has a large number of passages 9a for the exhaust gas in its axial direction. Numeral 10 is a layer of active refractory metallic oxide containing the catalytic metal, and the layer 10 is deposited on the surfaces of said passages 9a. Numeral 11 is a refractory metallic oxide layer containing no catalytic metal, and is deposited on the layer 10 of active refractory metallic oxide containing the catalytic metal. The layer 11 is in a porous state, as is obvious from FIG. 4, and is so permeable to the exhaust gas, that the catalytic metal can be brought in good contact with the exhaust gas.

EXAMPLE 1

Initially, a dipping solution was prepared in the following manner.

To a well mixed solution containing 15 g of alumina sol and 20 g of $Al(NO_3)_3$ was gradually added a mixed solution of 50 cc of colloidal silica and 50 cc of water little by little with stirring. Then, 160 g of powdery $\gamma$-$Al_2O_3$ and 100 cc of water were alternately added to the solution with stirring. Monolithic carriers as shown by 9 in FIG. 3 were dipped into the resulting dipping solution for about 1 to about 2 minutes. Then, the monolithic carriers were picked up, made free from the excessive solution by light swing, dried with compressed air for about 10 minutes. Then, the monolithic carriers were dried in a hot air drier kept at about 140°C for about 3 to about 4 hours, and then calcined at 800°C in air for 1 hour. Then, the calcined monolithic carriers were dipped in an aqueous 0.1 M chloroplatinic acid solution for about 30 seconds, picked up, made free from the excessive solution by light swing, dried with compressed air for about 10 minutes, and further dried in a hot air drier kept at about 170°C for about 3 to about 4 hours. Then, the dried monolithic carriers were subjected to reduction in a hydrogen gas stream at 200°C for 30 minutes. Separately, the dipping solution as prepared above was diluted to two-fold with water, and said calcined monolithic carriers were dipped in the diluted dipping solution for about 1 to about 2 minutes, picked up, blown with compressed air to make the carriers free from excessive solution, and dried in a hot air drier kept at about 140°C for about 3 to about 4 hours.

Then, the carriers were calcined at 500°C in air atmosphere for 1 hour, and finally subjected to reduction in a hydrogen gas stream at 200°C for 30 minutes.

In this manner, the $\gamma$-$Al_2O_3$ layer containing a small amount of platinum (which corresponds to the active refractory metal oxide layer 10 containing the catalytic metal as shown in FIG. 4) was deposited on inside surfaces of the passages penetrating through the monolithic carrier, and further the exhaust gas-permeable $\gamma$-$Al_2O_3$ layer (which corresponds to the refractory metal oxide layer 11 containing no catalytic metal as shown in FIG. 4) was deposited on said $\gamma$-$Al_2O_3$ layer.

The $\gamma$-$Al_2O_3$ layer containing a small amount of platinum and the exhaust gas-permeable $\gamma$-$Al_2O_3$ layer contained some colloidal silica contained in the dipping solution, which was used for depositing the layers. Same situation as this dominates also in the successive Examples 2 to 5 and Comparative Example 1.

The amount of $\gamma$-$Al_2O_3$ further deposited on the $\gamma$-$Al_2O_3$ layer containing a small amount of platinum, that is, the amount of $\gamma$-$Al_2O_3$ in the outermost layer was 10.5% by weight, on the basis of the weight of monolithic carriers having the $\gamma$-$Al_2O_3$ containing a small amount of platinum, and 30.5 g per gram of platinum.

The amount of platinum and total amount of $\gamma$-$Al_2O_3$ were 0.345% by weight and 29.5% by weight, respectively, on the basis of the weight of the monolithic carriers.

EXAMPLE 2

In the process for depositing the $\gamma$-$Al_2O_3$ layer further on the $\gamma$-$Al_2O_3$ layer containing a small amount of platinum, which was deposited on inside surfaces of the passages penetrating through the monolithic carriers in Example 1, the dipping solution diluted to four-fold with water was used. That is to say, deposition of layers was carried out in the same manner as in Example 1, except that the resulting dipping solution diluted to four-fold was used in place of said dipping solution diluted to two-fold. The amount of $\gamma$-$Al_2O_3$ deposited further on the $\gamma$-$Al_2O_3$ layer containing a small amount of platinum was 6.2% by weight, on the basis of the weight of the monolithic carriers having the $\gamma$-$Al_2O_3$ layer containing a small amount of platinum, and 17.0 g per gram of platinum in this Example 2. Total amount of $\gamma$-$Al_2O_3$ and the amount of platinum were 21.4% by weight and 0.362% by weight, respectively, on the basis of the weight of the monolithic carriers.

EXAMPLE 3

In the process for depositing the $\gamma$-$Al_2O_3$ layer further on the $\gamma$-$Al_2O_3$ layer containing a small amount of platinum, which was deposited on inside surfaces of the passages penetrating through the monolithic carriers in Example 1, the dipping solution diluted to six-fold with water was used. That is to say, deposition of layers was carried out in the same manner as in Example 1, except that the resulting dipping solution diluted to six-fold was used in place of said dipping solution diluted to two-fold. The amount of γ-Al₂O₃ deposited further on the γ-Al₂O₃ layer containing a small amount of platinum was 4.0 % by weight, on the basis of the weight of the monolithic carriers having the γ-Al₂O₃ layer containing a small amount of platinum, and 11.4 g per gram of platinum in this Example 3. Total amount of γ-Al₂O₃ and the amount of platinum were 18.5 % by weight and 0.350 % by weight, respectively, on the basis of the weight of the monolithic carriers.

EXAMPLE 4

In the process for depositing the γ-Al₂O₃ layer further on the γ-Al₂O₃ layer containing a small amount of platinum, which was deposited on inside surfaces of the passages penetrating through the monolithic carriers in Example 1, the dipping solution diluted to ten-fold with water was used. That is to say, deposition of layers was carried out in the same manner as in Example 1, except that the resulting dipping solution diluted to ten-fold was used in place of said dipping solution diluted to two-fold. The amount of γ-Al₂O₃ deposited further on the γ-Al₂O₃ layer containing a small amount of platinum was 1.4 % by weight, on the basis of the weight of the monolithic carriers having the γ-Al₂O₃ layer containing a small amount of platinum, and 3.58 g per gram of platinum in this EXAMPLE 4. Total amount of γ-Al₂O₃ and the amount of platinum were 16.8 % by weight and 0.395 % by weight, respectively, on the basis of the weight of the monolithic carriers.

EXAMPLE 5

In the process for depositing the γ-Al₂O₃ layer further on the γ-Al₂O₃ layer containing a small amount of platinum, which was deposited on inside surfaces of the passages penetrating through the monolithic carriers in Example 1, the original dipping solution, that is, the dipping solution not diluted with water was used. That is to say, deposition of layers was carried out in the same manner as in Example 1, except that the original, not diluted dipping solution was used in place of said dipping solution diiluted to two-fold. The amount of γ-Al₂O₃ deposited further on the γ-Al₂O₃ layer containing a small amount of platinum was 17.8 % by weight, on the basis of the weight of the monolithic carriers having the γ-Al₂O₃ layer containing a small amount of platinum, and 50.7 g per gram of platinum in this Example 5. Total amount of γ-Al₂O₃ and the amount of platinum were 31.5 % by weight and 0.351 % by weight, respectively, on the basis of the weight of the monolithic carriers.

EXAMPLE 6

To 200 ml of an aqueous 0.1 M chloroplatinic acid solution were added 20 g of γ-Al₂O₃ and 10 g of Al-(OH)₂·Cl·nH₂O (Takibine, a trademark) with sufficient stirring, and then monolithic carriers as depicted by 9 in FIG. 3 were dipped in the resulting solution for about 1 to about 2 minutes, then picked up, made free from the excessive solution by light swing, spontaneously dried for about 5 to about 6 hours, and finally dried in a hot air drier kept at about 170°C for about 3 to about 4 hours. Then, the dried monolithic carriers were subjected to reduction in a hydrogen gas stream at 200°C for 30 minutes, and calcined in air atmosphere at 800°C for 30 minutes. The resulting monolithic carriers having the γ-Al₂O₃ containing platinum were dipped in a well mixed solution containing 10 g of γ-Al₂O₃ and 5 g of Al(OH)₂·Cl·nH₂O (Takibine, a trademark) in 200 cc of water for about 1 to about 2 minutes, picked up, spontaneously dried for about 5 to about 6 hours, further dried in a drier kept at about 170°C for about 3 to about 4 hours, and finally calcined in air atmosphere at 500°C for 1 hour. The amount of the γ-Al₂O₃ layer further deposited on the γ-Al₂O₃ layer containing a small amount of platinum was 2.1 % by weight, on the basis of the weight of the monolithic carrier having the γ-Al₂O₃ layer containing a small amount of platinum, and 5.4 g per gram of platinum. Total amount of γ-Al₂O₃ and the amount of platinum were 5.3 % by weight and 0.390 % by weight, respectively, on the basis of the weight of the monolithic carriers.

To clarify the effect of the present invention, comparative examples are given below:

COMPARATIVE EXAMPLE 1

To a well mixed solution of 15 g of alumina sol and 20 g of Al(NO₃)₃ was gradually added a mixed solution of 50 cc of colloidal silica and 50 cc of water little by little with stirring. Then, 160 g of powdery γ-Al₂O₃ and 100 cc of water were alternately added to the solution with stirring.

Monolithic carriers as depicted by 9 in FIG. 3 were dipped in the resulting dipping solution for about 1 to about 2 minutes, then picked up from the solution, made free from the excessive solution by light swing, dried with compressed air for about 10 minutes, further dried in a hot air drier kept at about 140°C for about 3 to about 4 hours, and calcined in air at 800°C for 1 hour.

Then, the calcined monolithic carriers were dipped in an aqueous 0.1 M chloroplatinic acid solution for about 30 seconds, picked up, made free from the excessive solution by swing, dried with compressed air for about 10 minutes, and further dried in a hot air drier kept at 170°C for about 3 to about 4 hours. Then, the dried monolithic carriers were subjected to reduction in a hydrogen gas stream at 200°C for 30 minutes, and then calcined in air atmosphere at 800°C for 30 minutes. The amount of platinum and the amount of γ-Al₂O₃ were 0.360 % by weight and 17.2 % by weight, respectively, on the basis of the weight of the monolithic carrier in this COMPARATIVE EXAMPLE 1.

COMPARATIVE EXAMPLE 2

Monolithic carriers as depicted by 9 in FIG. 3 were dipped in an aqueous 0.1 M chloroplatinic acid solution for about 30 seconds, picked up, made free from the excessive solution by swing, dried with compressed air for about 10 minutes, and further dried in a hot air drier kept at 170°C for about 3 to about 4 hours. Then, the dried monolithic carriers were subjected to reduction in a hydrogen gas stream at 200°C for 30 minutes, and then calcined at 800°C in air atmosphere for 30 minutes. The amount of platinum was 0.359 % by weight, on the basis of the weight of the monolithic carrier, in this COMPARATIVE EXAMPLE 2.

The catalysts prepared according to the foregoing Examples 1 to 6, and COMPARATIVE EXAMPLES 1 to 2 were tested on one hand, to determine initial CO percent purification under the conditions given in Table 1, and, on the other hand, to determine steady CO percent purification under the same conditions as given in Table 1, after the catalysts of Examples 1 to 6 and COMPARATIVE EXAMPLES 1 and 2 were subjected to duration tests for 200 hours under the same conditions as given in Table 1.

Table 1

| Exhaust gas composition: | CO about 1.5 % |
| | HC about 1000 ppm |
| Outlet gas temperature of the monolithic carriers: | 800°C |
| Gasoline: | unleaded gasoline |

The results are given in the following Table 2.

Table 2

| Ex. No. | CO Percent Purification | | Amount of the outermost layer to the carrier (% by weight) |
| | Initial | Steady | |
| --- | --- | --- | --- |
| 1 | 83 % | 78 % | 10.5 |
| 2 | 90 % | 85 % | 6.2 |
| 3 | 91 % | 85.5 % | 4.0 |
| 4 | 92 % | 82 % | 1.4 |
| 5 | 62 % | 52 % | 17.8 |
| 6 | 89 % | 78 % | 2.1 |
| Comp. Ex. 1 | 92 % | 65 % | — |
| Comp. Ex. 2 | 89 % | 65 % | — |

Figure 1:
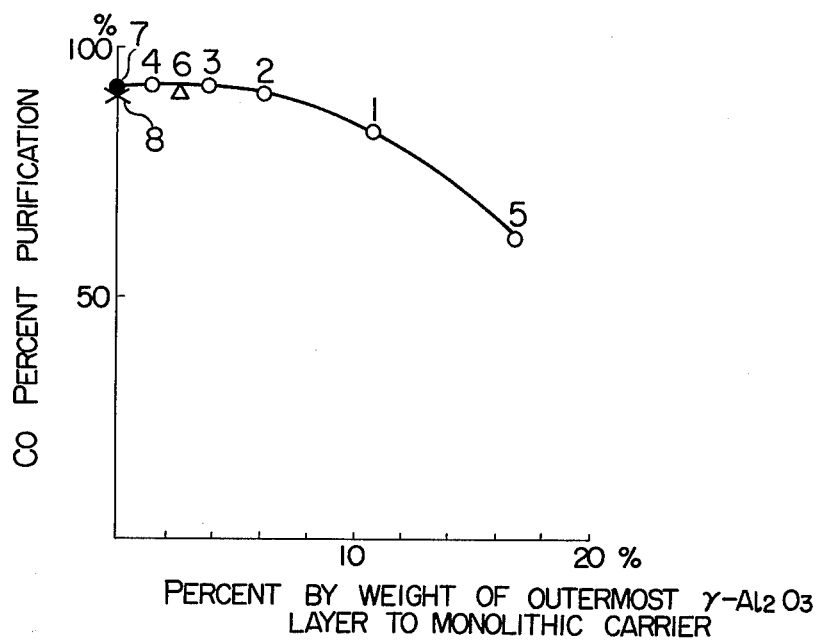
FIG. 1 is a characteristic diagram showing relations between percent by weight of the outermost, exhaust gas-permeable $\gamma$-$Al_2O_3$ layer to the monolithic carrier having the $\gamma$-$Al_2O_3$ layer containing platinum of the present invention and CO percent purification before durability tests.
Figure 2:
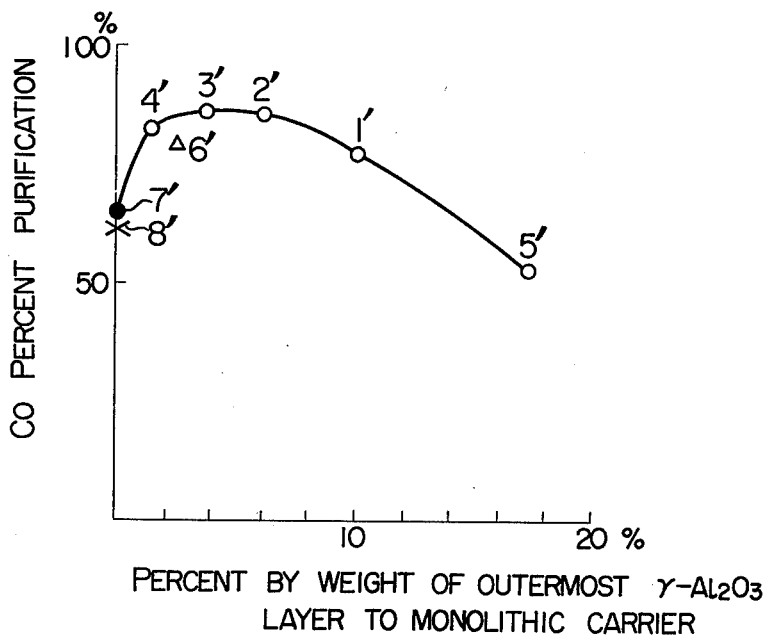
FIG. 2 is a characteristic diagram showing relations between percent by weight of the outermost, exhaust gas-permeable $\gamma$-$Al_2O_3$ layer to the monolithic carrier having the $\gamma$-$Al_2O_3$ layer containing platinum of the present invention and CO percent purification after the duration tests.

The following results are also shown in FIG. 1 for the initial CO percent purification, and in FIG. 2 for the steady CO percent purification after the duration test.

In FIG. 1, the ordinate presents CO percent purification (%) of catalysts and abscissa amounts of the $\gamma$-$Al_2O_3$ layer deposited further on the $\gamma$-$Al_2O_3$ layer containing a small amount of platinum, that is, the amount of $\gamma$-$Al_2O_3$ of the outermost layer in percent by weight, on the basis of the weight of the monolithic carrier having the $\gamma$-$Al_2O_3$ layer containing a small amount of platinum. In FIG. 1, the CO percent purification represents the initial ones, that is, those of the catalysts before the duration test. Numerals 1 to 6 in FIG. 1 relate to the catalysts prepared according to Examples 1 to 6 of the present invention, respectively, and numerals 7 and 8 the catalysts of Comparative Examples 1 and 2, respectively.

FIG. 2 shows relations between CO percent purification of the catalysts after the duration test, and percent by weight of the $\gamma$-$Al_2O_3$ layer further deposited on the $\gamma$-$Al_2O_3$ layer containing a small amount of platinum on the basis of the weight of the monolithic carriers having the $\gamma$-$Al_2O_3$ layer containing a small amount of platinum, where the ordinate and the abscissa represent the same definitions as in FIG. 1. Numerals 1' to 6' in FIG. 2 relate to the catalysts prepared according to Examples 1 to 6, respectively, and numerals 7' and 8' the catalysts of Comparative Examples 1 and 2.

As is obvious from FIGS. 1 and 2, the catalysts of the present invention, that is, the catalysts having the structure as shown in FIG. 4 have a good initial activity and also a remarkable durability, as compared with the catalysts of the conventional structure.

In detail, the CO percent purification of the catalysts of Comparative Examples 1 and 2 before the duration test is as high as 93 to 95 %, and the CO percent purification of the catalysts of Examples 1 to 6 before the duration test are 62 to 94.5 %. However, the CO percent purification of the catalysts of Comparative Examples 1 and 2 after the duration test are 62 to 65 %, which is by about 30 % lower than the CO percent purification before the duration test, whereas the CO percent purification of the catalysts of Examples 1 to 6 after the duration test are 53 to 86 %, which is only by about 8 to about 9 % lower than the CO percent purification before the duration test. It is seen that the present catalysts of Examples 1 to 6, that is, the catalysts having a structure as shown in FIG. 4 have a better activity than that of the catalysts of Comparative Examples 1 and 2, that is, the catalysts of the conventional structure.

The foregoing Examples 1 to 6, are directed to the catalysts for oxidation. The present invention can also provide catalysts for purifying nitrogen oxides ($NO_x$) contained in the exhaust gas by reduction. The following Example 7 and Comparative Example 3 illustrate this embodiment.

EXAMPLE 7

Monolithic carriers, as depicted by 9 in FIG. 3, which had a $\gamma$-$Al_2O_3$ layer on the inside surface of the passages penetrating through the monolithic carriers, as prepared in the same manner as in Example 1, were dipped in an aqueous 0.05 M chloroplatinic acid solution for about 30 seconds, picked up, dried with compressed air for about 10 minutes, and further dried in a hot air drier kept at about 170°C for about 3 to about 4 hours, Then, the dried monolithic carriers were subjected to reduction in a hydrogen gas stream at 200°C for 30 minutes, and then left for cooling. The cooled monolithic carriers wee dipped in an aqueous 0.1 M ruthenium chloride solution for about 30 seconds, picked up, and then subjected to drying and reduction in the same manner as above. Then, the resulting monolithic carriers are dipped in the dipping solution used in Example 3 for about 1 to about 2 minutes, picked up, blown with compressed air to remove excess water, and dried in a hot air drier kept at about 140°C for about 3 to about 4 hours. Then, the dried monolithic carriers are calcined in air atmosphere at 600°C for 30 minutes, and finally subjected to reduction in a hydrogen gas stream at 200°C for 30 minutes. The amount of the $\gamma$-$Al_2O_3$ layer further deposited on the $\gamma$-$Al_2$ $O_3$ layer containing a small amount of platinum and ruthenium was 4.2 % by weight, on the basis of the weight of the monolithic carriers having the $\gamma$-$Al_2O_3$ layer having a small amount of platinum and ruthenium, and 23.0 g per gram of platinum and 28.8 g per gram of ruthenium in this Example 7.

COMPARATIVE EXAMPLE 3

Platinum and ruthenium were deposited onto the $\gamma$-$Al_2O_3$ layer on the inside surfaces of passages penetrating through the monolithic carriers as depicted by 9 in FIG. 3, and prepared in the same manner as in Example 1, by dipping, drying, etc. in the same manner as in Example 7. The amounts of platinum, ruthenium and $\gamma$-$Al_2O_3$ were 0.17 % by weight, 0.21 % by weight and 17.5 % by weight, respectively, on the basis of the weight of the monolithic carrier in this Comparative Example 3.

The catalysts prepared according to the foregoing Example 7 and Comparative Example 3 were tested, on one hand, to determine initial $NO_x$ percent purification under the conditions given in Table 3, and, on the other hand, to determine steady $NO_x$ percent purification under the same conditions as given in Table 3, after the catalysts of Example 7 and Comparative Example 3 were subjected to duration tests of 150 hours under the same conditions as given in Table 3.

Table 3

| Exhaust gas composition: | CO: about 1.5 % |
| | HC: about 1300 ppm |

Table 3-continued

|  |  |
|---|---|
| Outlet gas temperature of the monolithic carriers: | $NO_x$: 3000 ppm<br>720°C |
| Gasoline: | Unleaded gasoline |

The results are given as follows:

For the catalyst of Example 7, the initial $NO_x$ percent purification and the steady $NO_x$ percent purification after the duration test were 89 % and 82.5 %, respectively, whereas for the catalysts of Comparative Example 3, the initial $NO_x$ percent purification and the steady $NO_x$ percent purification after the duration test were 87 % and 55.5 %, respectively. It is evident from these results that the catalyst of Example 7 has better initial $NO_x$ percent purification and steady $NO_x$ percent purification after the duration test than the catalyst of Comparative Example 3.

In the foregoing Examples 1 to 7, the active alumina, that is, $\gamma$-$Al_2O_3$, was used as the outermost layer, and the amounts of the outermost $\gamma$-$Al_2O_3$ layer were changed. On the other hand in the following Examples 8 to 10, other refractory oxides than $\gamma$-$Al_2O_3$ were used as the outermost layer.

EXAMPLE 8

The monolithic carriers having a $\gamma$-$Al_2O_3$ layer containing a small amount of platinum prepared in the same manner as in Example 1 were dipped in a dipping solution containing 371 g of lanthanum chloride ($LaCl_2 \cdot 7H_2O$) in 1 l of distilled water for about 1 to 2 minutes, picked up, blown with compressed air to remove excess solution, and dried in a hot air drier kept at about 140°C for about 3 to about 4 hours.

Then, the dried monolithic carriers were calcined in air atmosphere at 600°C for 30 minutes, and then subjected to reduction in a hydrogen gas stream at 200°C for 30 minutes to convert lanthanum chloride to lanthanum oxide. The resulting oxide on the outermost layer was mostly in a form of $La_2O_3$, and the amount of $La_2O_3$ was 5.1 % by weight on the basis of the weight of the monolithic carriers having the $\gamma$-$Al_2O_3$ containing a small amount of platinum, and 14.4 g per gram of platinum.

EXAMPLE 9

Deposition of the outermost layer was carried out in the same manner as in Example 8, except that a dipping solution containing 244 g of barium chloride ($BaCl_2 \cdot 2H_2O$) in 1 l of distilled water was used in place of the lanthanum chloride solution. The oxides in the outermost layer took a form of barium oxide (BaO), and the amount of barium oxide was 4.7 % by weight on the basis of the weight of the monolithic carrier, and 13.5 g per gram of platinum.

EXAMPLE 10

Deposition of the outermost layer was carried out in the same manner as in Example 8, except that a dipping solution containing 84.8 g of lithium chloride (LiCl) in 1 l of distilled water was used in place of the lanthanum chloride solution. The oxides in the outermost layer took a form of lithium oxide ($Li_2O$) and the amount of lithium oxide was 1.5 % by weight on the basis of the weight of the monolithic carrier, and 4.32 g per gram of platinum.

The catalysts prepared according to the foregoing Examples 8 to 10 were tested, on one hand, to determine initial CO percent purification under the same conditions as given in Table 1, and, on the other hand, to determine steady CO percent purification under the same conditions as given in Table 1 after the catalysts of Examples 8 to 10 were subjected to duration tests for 200 hours under the same conditions as given in Table 1.

The results are given in the following Table 4.

Table 4

| Ex. No. | CO Percent purification | | Amount of the outermost layer to the carrier (% by weight) |
|---|---|---|---|
|  | Initial | Steady |  |
| 8 | 91.5 % | 87.0 % | 5.1 |
| 9 | 92.5 % | 90.5 % | 4.7 |
| 10 | 89.0 % | 86.0 % | 1.5 |

It is seen from the foregoing results that the catalysts having an outermost layer consisting from other than $\gamma$-$Al_2O_3$ have also good effects in the initial and steady CO percent purifications.

The foregoing Examples 8 10 are directed to the catalysts for oxidation of carbon monoxide (CO) and hydrocarbons (HC) contained in automobile exhaust gas, but the following Examples 11 to 14 illustrate the catalysts for reduction of nitrogen oxides ($NO_x$) contained in the automobile exhaust gas.

EXAMPLE 11

The monolithic carriers having the $\gamma$-$Al_2O_3$ layer prepared in the same manner as in Example 1 were dipped in an aqueous 0.05 M chloroplatinic acid solution for about 30 seconds, picked up, dried with compressed air for about 10 minutes, and further dried in a hot air drier kept at about 170°C for about 3 to about 4 hours. Then, the dried monolithic carriers were subjected to reduction in a hydrogen gas stream at 200°C for 30 minutes, and left for cooling, Then, the cooled monolithic carriers were dipped in an aqueous 0.1 M ruthenium chloride solution for about 30 seconds, picked up, and subjected to drying and reduction in the same manner as above.

Then, the resulting monolithic carriers were dipped in a dipping solution for depositing the outermost layer used in Example 3, that is, the dipping solution diluted to six-fold with water, for about 1 to about 2 minutes, blown with compressed air to remove excess water, and dried in a hot air drier kept at about 140°C for about 3 to about 4 hours.

Then, the dried monolithic carriers were calcined in air atmosphere at 600°C for 30 minutes, and finally subjected to reduction in a hydrogen gas stream at 200°C for 30 minutes.

The amount of $\gamma$-alumina in the outermost layer on the monolithic carriers thus prepared was 4.2 % by weight on the basis of the carriers having the $\gamma$-$Al_2O_3$ layer containing platinum and ruthenium, and 23.0 g per gram of platinum and 28.8 g per gram of ruthenium.

EXAMPLE 12

Catalyst was prepared in the same manner as in Example 11, except that the dipping solution of Example 8 was used to deposit the outermost layer in place of the dipping solution used in Example 11. The amount of $La_2O_3$ of the outermost layer was 5.0 % by weight on the basis of the weight of the monolithic carriers having the $\gamma$-$Al_2O_3$ layer containing platinum and ruthenium, and 29 g per gram of platinum and 36 g per gram of ruthenium in this Example 12.

EXAMPLE 13

Catalyst was prepared in the same manner as in Example 11, except that the dipping solution of Example 9 was used to deposit the outermost layer in place of the dipping solution used in Example 11. The amount of BaO was 4.8 % by weight on the basis of the weight of the monolithic carriers having the $\gamma$-$Al_2O_3$ containing platinum and ruthenium, and 26.5 g per gram of platinum, and 34 g per gram of ruthenium in this Example 13.

EXAMPLE 14

Catalyst was prepared in the same manner as in Example 11, except that the dipping solution of Example 10 was used to deposit the outermost layer in place of the dipping solution used in Example 11. The amount of $Li_2O$ was 1.6 % by weight on the basis of the weight of the monolithic carriers having the $\gamma$-$Al_2O_3$ layer containing platinum and ruthenium, and 9 g per gram of platinum and 1.15 g per gram of ruthenium.

COMPARATIVE EXAMPLE 4

Platinum and ruthenium were deposited onto the monolithic carriers having the active $\gamma$-$Al_2O_3$ layer prepared according to Comparative Example 1 by carrying out dipping, drying and reduction in the same manner as in Example 11. The resulting catalyst had no outermost layer as in Comparative Example 1.

The amounts of platinum, ruthenium and active $\gamma$-$Al_2O_3$ were 0.17 % by weight, 0.21 % by weight and 17.5 % by weight, respectively, on the basis of the weight of the monolithic carriers in this Comparative Example 4.

The catalysts prepared according to the foregoing Examples 11 to 14 and Comparative Example 4 were tested, on one hand, to determine initial $NO_x$ percent purification under the same conditions as given in Table 3, and on the other hand, to determine steady $NO_x$ percent purification under the same conditions as given in Table 3 after the catalysts of Examples 11 to 14 and Comparative Example 4 were subjected to duration tests for 150 hours under the same conditions as given in Table 3.

Figure 5:
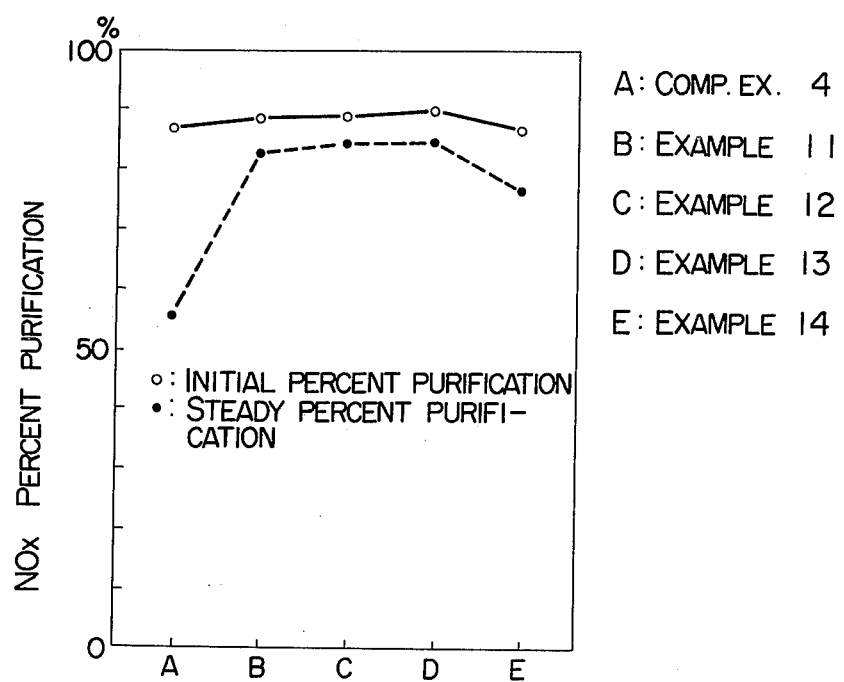
FIG. 5 is a diagram showing relations of several catalysts used in Examples and Comparative Examples and initial and steady $NO_x$ percent purifications.

The results are given in the following Table 5 and also plotted in FIG. 5.

Table 5

| Ex. No. | $NO_x$ percent purification Initial | Steady | Amount of the outermost layer to the carrier (% by weight) |
|---|---|---|---|
| 11 | 89 % | 82.5 % | 4.2 |
| 12 | 89 % | 84 % | 5.0 |
| 13 | 90 % | 84.5 % | 4.8 |
| 14 | 87 % | 76.5 % | 1.6 |
| Comp. Ex. 4 | 87 % | 55.5 % | — |

It is seen from the foregoing results that the present catalysts have good effects in the initial and steady $NO_x$ percent purifications, as compared with the catalyst having no outermost layer.

Quite contrary to such a presumption that, when an exhaust gas-permeable refractory metallic oxide layer, for example, a $\gamma$-$Al_2O_3$ layer, is deposited further onto an active metallic oxide layer, for example, $\gamma$-$Al_2O_3$ layer, containing a catalytic metal that plays the most part of catalytic activity, for example, platinum, an initial catalytic activity would be considerably lowered owing to the coating effect of the outermost layer, the initial catalytic activities of the present catalysts are equivalent or rather superior to those of the conventional catalysts. It seems that a special structure of the present catalysts favors a catalytic reaction of the exhaust gas with the catalytic metal, for example, platinum. That is to say, it seems that the exhaust gas-permeable $\gamma$-$Al_2O_3$ layer deposited on the $\gamma$-$Al_2O_3$ layer containing platinum would permit the exhaust gas to have a substantially slowest flow velocity at the position of the exhaust gas-permeable outermost $\gamma$-$Al_2O_3$ layer throughout the passages penetrating through the monolithic carriers. In other words, particles of $\gamma$-$Al_2O_3$ in the exhaust gas-permeable $\gamma$-$Al_2O_3$ layer deposited on the $\gamma$-$Al_2O_3$ layer containing platinum are larger than the particles of platinum, and the exhaust gas is so retained in clearances among the $\gamma$-$Al_2O_3$ particles as to effect sufficient reaction with platinum. Furthermore, the exhaust gas-permeable $\gamma$-$Al_2O_3$ layer deposited further on the $\gamma$-$Al_2O_3$ layer containing platinum that plays the most part of catalytic activity catches or combines poisoning materials such as lead, sulfur, phosphorus, etc. contained in the exhaust gas, with itself, and therefore there is less chance of poisoning the platinum with these poisoning materials. That is to say, in the conventional catalysts, the particles of the catalytic metal itself are enlarged by said poisoning materials and deteriorated, or the catalytic metal is combined with the poisoning materials to form compounds, and deteriorated, or the poisoning materials are deposited on the surfaces of the catalytic metal and deteriorate the catalytic metal.

In the present catalysts, an exhaust gas-permeable $\gamma$-$Al_2O_3$ layer is deposited further on the $\gamma$-$Al_2O_3$ layer containing platinum, and the sizes of particles of the poisoning materials are larger than the sizes of the clearances among the particles of the exhaust gas-permeable $\gamma$-$Al_2O_3$ layer, and consequently the particles of the poisoning materials cannot be entered into the clearances among the $\gamma$-$Al_2O_3$ particles or caught or absorbed by the $\gamma$-$Al_2O_3$ particles. That is, the platinum is hardly poisoned by the poisoning materials. Further, it seems that the exhaust gas-permeable $\gamma$-$Al_2O_3$ layer reacts with the poisoning materials to form compounds.

Furthermore, in the conventional catalysts, the particles of the catalytic metal are enlarged by the elevated temperature of the exhaust gas, and their catalytic activities are deteriorated, resulting in a decrease in the durability. On the other hand, in the present catalysis the exhaust gas-permeable $\gamma$-$Al_2O_3$ outermost layer can retard the heat transfer to the catalytic metal, and therefore the particles of the catalytic metal are hardly enlarged, resulting in an improvement in the durability.

As described above, in the present catalysts, an active refractory metal oxide layer containing a catalytic metal is deposited as first layer on the inside surfaces of a plurality of passages penetrating through monolithic carrier, and further an exhaust gas-permeable refractory metallic oxide layer containing no catalytic metal is deposited on the first layer. Therefore, there is less chance of poisoning the catalytic metal with lead, sulfur, phosphorus, etc. contained in the exhaust gas, and the present catalysts have a good effect in improvements in the durability and resistance to poisoning without any considerable reduction in the initial catalytic activity, as compared with the conventional catalysts.

What is claimed is:

1. A catalyst for purifying exhaust gas from vehicles, which comprises a monolithic carrier having a plurality of exhaust gas passages penetrating through the carrier, a layer of active refractory metallic oxide selected from the group consisting of γ-alumina, magnesium oxide, beryllium oxide and thorium oxide containing a catalytic metal of the platinum group deposited as first layer on inside surfaces of said plurality of the passages, and a layer of exhaust gas-permeable refractory metallic oxide selected from the group consisting of γ-alumina, magnesium oxide, beryllium oxide, thorium oxide, lanthanum oxide, barium oxide and lithium oxide free from said catalytic metal deposited as an outermost layer further upon the first layer.

2. A catalyst according to claim 1, wherein the catalytic metal comprise at least two metals of the platinum group elements.

3. A catalyst according to claim 1 including also at least one oxide of nickel, iron, cobalt, copper and chromium.

4. A catalyst according to claim 1, wherein 1 to 20 % by weight of the catalytic metal is contained in the first layer on the basis of the weight of the active refractory metallic oxide layer containing the catalytic metal.

5. A catalyst according to claim 1, wherein the catalytic metal is platinum, and the active refractory metallic oxide and the exhaust gas-permeable refractory metallic oxide are γ-alumina.

6. A catalyst according to claim 4, wherein an amount of the γ-alumina as the active refractory metallic oxide is four to 30 times by weight as much as that of platinum as the catalytic metal.

7. A catalyst according to claim 1, wherein the catalytic metal is a mixture of platinum and ruthenium, and the active refractory metal oxide and the exhaust gas-permeable refractory metal oxide are γ-alumina.

8. A catalyst according to claim 1 wherein the catalytic metal consists of platinum.

9. A catalyst according to claim 1 wherein the catalytic metal is a mixture of platinum and another metal of the platinum group.

10. A catalyst according to claim 1 wherein the catalytic metal is a mixture of platinum and at least one oxide of nickel, iron, cobalt, copper or chromium.

* * * * *